No. 661,166.
R. R. BOYD.
PROCESS OF TREATING COTTON WASTE.
(Application filed Jan. 6, 1898. Renewed Mar. 2, 1900.)
Patented Nov. 6, 1900.
(No Model.)
3 Sheets—Sheet 1.
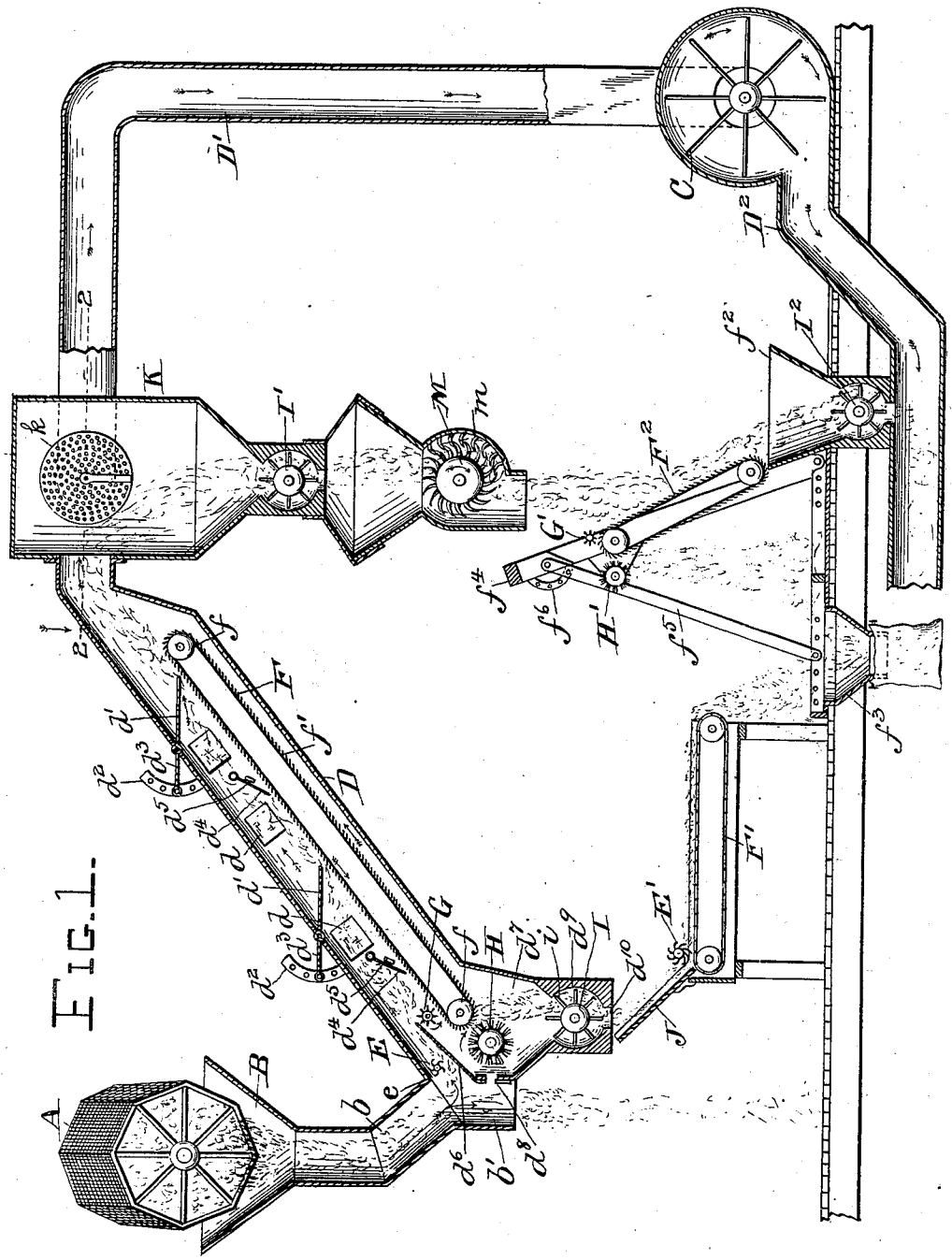

No. 661,166. Patented Nov. 6, 1900.
R. R. BOYD.
PROCESS OF TREATING COTTON WASTE.
(Application filed Jan. 6, 1898. Renewed Mar. 2, 1900.)
(No Model.) 3 Sheets—Sheet 2.
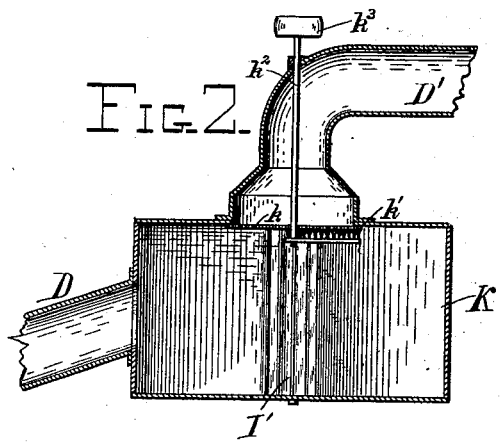
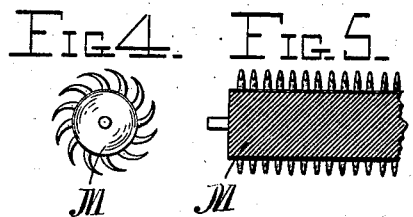
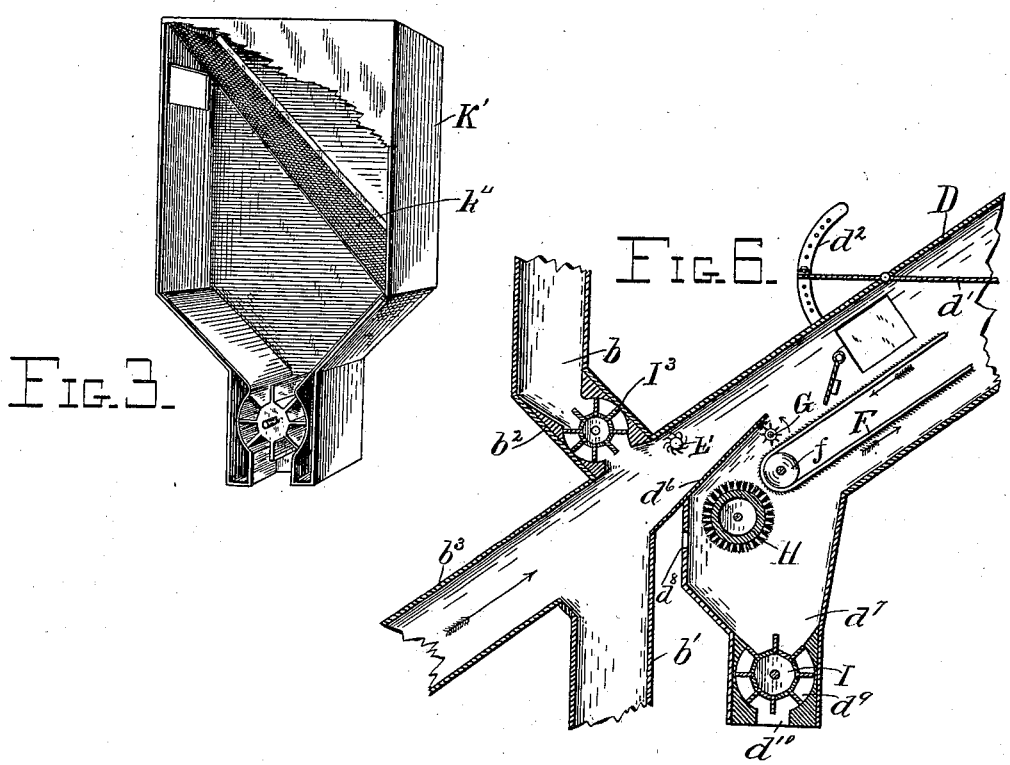

No. 661,166. Patented Nov. 6, 1900.
R. R. BOYD.
PROCESS OF TREATING COTTON WASTE.
(Application filed Jan. 6, 1898. Renewed Mar. 2, 1900.)
(No Model.) 3 Sheets—Sheet 3.
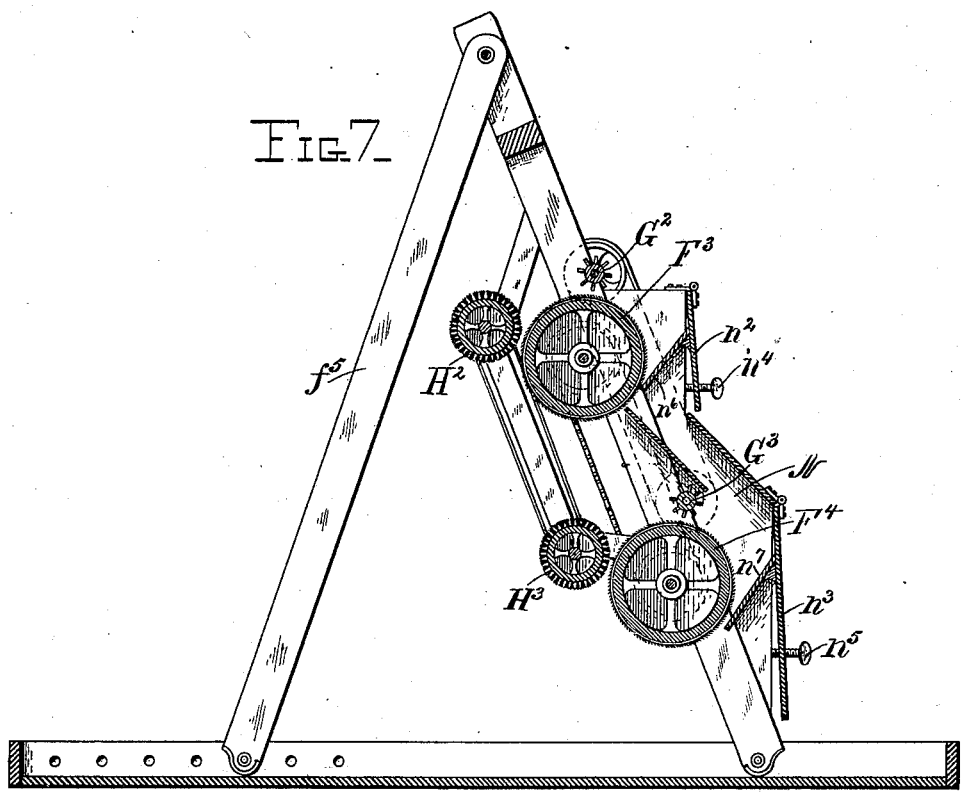
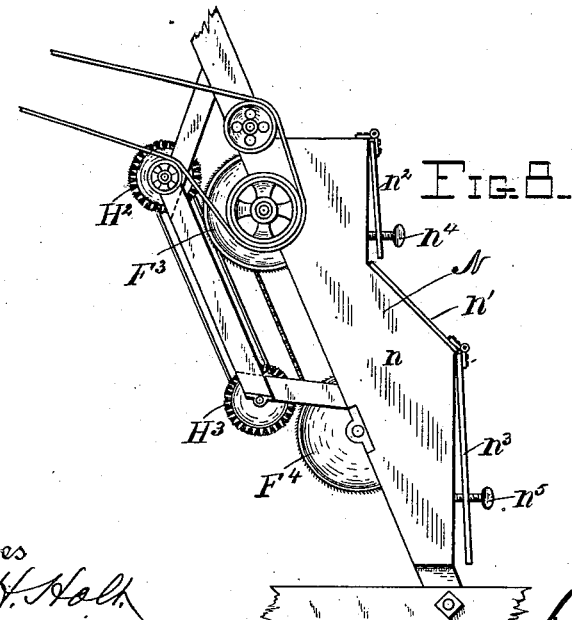

UNITED STATES PATENT OFFICE.

ROBERT R. BOYD, OF MEMPHIS, TENNESSEE.

PROCESS OF TREATING COTTON-WASTE.

SPECIFICATION forming part of Letters Patent No. 661,166, dated November 6, 1900.

Application filed January 6, 1898. Renewed March 2, 1900. Serial No. 7,126. (No model.)

*To all whom it may concern:*

Be it known that I, ROBERT R. BOYD, a citizen of the United States, residing at Memphis, in the county of Shelby and State of Tennessee, have invented certain new and useful Improvements in Processes of Treating Cotton-Waste; and I do hereby declare the following to be a full, clear, and exact description of the invention, such as will enable others skilled in the art to which it appertains to make and use the same.

My invention relates to the process of treating cotton-waste of the character discharged from the end of the screen in oil-mills; and it has for its object to separate the cotton contained in such waste from the various impurities and to save the cotton.

In the drawings, Figure 1 represents a longitudinal vertical section of a complete apparatus for carrying my process into effect. Fig. 2 is a horizontal section taken on the line 2 2, Fig. 1. Fig. 3 shows a side view of a modification of the apparatus for separating the dust and light trash from the cotton, parts being broken away. Fig. 4 is a side elevation, and Fig. 5 is a longitudinal central section, of the toothed cylinder for breaking up the boll-hulls, &c. Fig. 6 is a longitudinal central section of a modification, showing the use of a blast-fan instead of a suction-fan. Fig. 7 represents a vertical longitudinal section of a modification of the final separating apparatus, and Fig. 8 is a side view of the same.

A represents the screen of an oil-mill through which the contents of the seed pile are passed preparatory to treating the seed. My process is specially designed to treat the waste or tailings from this screen, which consists of foreign bodies—such as nails, pieces of wood, strings, paper, &c.—mixed with pieces of cotton, seed entangled with pieces of cotton, boll-hulls, &c. The tailings from the screen are discharged into the hopper B, thence falling into the passage $b$, and finally into the passage $b'$, where they are met by an upward current of air drawn in through the apparatus by the fan C. The heavy trash—such as nails, pieces of wood, &c.—drops down against the force of the air-current, while the lighter part—such as strings, dust, pieces of cotton, &c.—are carried by the blast into the large inclined tube D. Just at the point of entrance into this tube D is a string-picker E, composed of a cylinder with curved teeth $e$ thereon. In the lower part of this tube and extending nearly the whole length thereof is an endless apron F, mounted on pulleys $f$, said endless apron being provided with small hooks $f'$. Ordinary card-clothing may be used upon this endless apron, which travels in the direction shown by the arrows and opposite in direction to the flow of the air current. The tube D is provided with the openings $d$, covered with glass or mica, so that the action of the interior parts may be observed. Movable valves or deflectors $d'$ are provided in the upper part of the tube D, and by means of the arms $d^3$ and sectors $d^2$ they may be adjusted and held in various positions. These valves are inclined upward in the direction of the flow of the current of air. Similar valves $d^4$, but pivoted in the sides of the tube D and pointing in the opposite direction, are provided. Stops $d^5$ are provided on the sides of the tube, so that the valves $d^4$ cannot touch the endless apron F. These valves, together with a deflector $d^6$ in the lower end of the tube D, cause the waste, under the influence of the air-current, to travel upward through the tube D and at times close to the conveyer F. Near the lower part of the conveyer F and just above it is a picker or doffer G, which serves to clean off boll-hulls or large masses which may adhere to the conveyer F. This is effected by having the picker revolve in a direction opposite to the travel of the conveyer F. At the lower end of said conveyer is a clearing-brush H, which revolves in the opposite direction to the movement of the endless apron and preferably at a more rapid rate, which results in loosening from the conveyer the cotton which has collected upon it and delivering it into the hopper-like extension $d^7$, located at the lower end of the tube D. This extension $d^7$ may be provided with an opening $d^8$, which may be made larger or smaller by a sliding valve. The use of this opening is to prevent the possible formation of vacuum in the extension $d^7$. This extension $d^7$ is provided with a circular enlargement $d^9$ and a discharge-enlargement $d^{10}$. In this enlargement $d^9$ revolves a cylinder I, provided with longitudinal blades $i$, which closely engage the sides of the enlargement $d^9$, forming an air-tight pocketed valve. A valve of this construction is shown more clearly in Fig. 3. The cotton as it is discharged from the enlargement $d^{10}$ falls upon an inclined board J, down which it slides to a horizontally-arranged endless conveyer F'. At the point where the cotton falls upon the conveyer it is subjected to the action of a second string-picker E'. If desired or necessary, any short strings or foreign material may be removed by hand from the cotton as it is carried along upon the conveyer F'. This conveyer discharges the cotton into a hopper $f^3$, provided with a bag at its lower end, whence it may be sent to the gin or any other desired place. The tube D terminates at its upper portion in the vacuum-box K, the lower part of which is closed by a pocketed valve I', similar in construction to the valve I. This vacuum-box K is provided with the circular screen $k$ on one of its sides, which connects, as shown in Fig. 2, with the pipe D', leading to the suction-fan. A brush $k'$ is mounted in the center of this screen, and by means of the rod $k^2$ and pulley $k^3$ it is revolved, clearing the meshes of the screen. In this vacuum-box all the remaining waste except the dust and small particles, which can pass through the screen, is caught and is delivered by the pocket-valve I' to the boll-huller. This boll-huller resembles the cylinder and concave in a threshing-machine, and consists of a cylinder M, provided with curved teeth, (shown in detail in Figs. 4 and 5,) which pass between similar teeth, but curved in the opposite direction, upon the concave $m$. These teeth thoroughly break up the boll-hulls, loosen the seeds (if there are any) from the cotton, and divide up all tangled masses. Thence the waste falls upon the endless apron $F^2$, which is inclined so that it is almost vertical. This endless apron is provided with card-clothing, which catches the pieces of cotton, allowing the boll-hulls and other impurities to drop into the hopper $f^2$, from whence they are delivered by the pocketed valve $I^2$ into the tube $D^2$, leading away from the fan C to the furnace or waste heap, as may be desired. The conveyer $F^2$ is mounted at a very sharp angle in the frame $f^4$, which is pivoted at its lower end. Braces $f^5$ are pivoted near the upper end of the frame $f^4$ and are fastened by pins at their lower ends to supports upon the floor. Sectors $f^6$, provided with holes, are fastened near the upper part of the frame $f^4$, and the braces $f^5$ are provided with holes registering with the holes in the sectors $f^6$. Pins are passed through these holes to stiffen the frame and hold it rigidly in position. A picker or doffer G' and brush H' are used in connection with the inclined endless conveyer $F^2$.

In Fig. 6 I have shown a modification of my apparatus adapted for use with a blast-fan instead of the suction-fan. In this case the tube D is arranged as before; but the tube $b^2$, entering the lower part of said tube D, is provided with a pocket-valve $I^3$. The blast comes from the fan through the tube $b^3$, and thence up the tube D. In other respects the action of the apparatus is similar to that already described.

In Fig. 3 I have shown a modification K' of the vacuum-chamber, which is provided with an inclined screen $k^4$, placed diagonally therein.

In Figs. 7 and 8 I have shown a modification of the final separator. In this case instead of an endless conveyer I use the cylinders $F^3$ and $F^4$, covered with card-clothing. Instead of endless aprons provided with card-clothing or cylinders so provided gin-saws may be used or, in fact, any moving body provided with an abrasive surface. Pickers or hull-doffers $G^2$ and $G^3$ are located nearly above the top of each cylinder, and brushes $H^2$ and $H^3$ are used to clear the cotton from the cylinders. The cylinders, doffers, and brushes are mounted in an adjustable inclined frame, as previously described. These cylinders are partially inclosed in a framework N, open at the top and bottom and consisting of the side pieces and the hinged pieces $n^2$ and $n^3$, which by means of the screws $n^4$ and $n^5$ may be adjusted upon the main frame N. Each of the hinged pieces $n^2$ and $n^3$ is provided with an inclined portion or breast $n^6$ and $n^7$, which breasts at their lower ends come in close proximity to the card-clothing upon the cylinders $F^3$ and $F^4$. By turning the screws $n^4$ and $n^5$ the parts $n^6$ and $n^7$ may be made to move toward or away from the cylinders $F^3$ and $F^4$.

The operation of my device is as follows: The waste discharged from the end of the screen A flows into the hopper B and thence into the passage $b$. As it leaves this passage it is met by an incoming current of air, and the heavy materials—such as sticks, stones, nails, pieces of wood, &c.—fall through the current, and the waste is thus freed from its heavy trash. The rest of the waste then passes into the tube D, meeting the string-picker E as it enters the tube, which takes out all the long strings. Passing farther on up the tube D, a considerable part of the cotton is caught by the card-clothing upon the conveyer F and then carried down and discharged through the passage $d^{10}$. After being subjected to the action of a second string-picker the part of the cotton which has left the tube D is delivered to the hopper $f^3$ in a clean condition. The rest of the waste passes on up the tube D. As it is drawn into the vacuum-chamber K, the current being there weakened, it all falls to the bottom of said chamber, except the dust and the lighter particles, which are drawn through the screen $k$. It is then delivered to the boll-huller, which thoroughly disintegrates the entire mass, and from thence to the final separator, the clean cotton passing into the hopper $f^3$ and the hulls, &c., into the hopper $f^2$, from whence they are discharged into the tube $D^2$ and disposed of as may be desired.

My invention renders it possible to save from the waste, which is commonly thrown away or burned, all of the cotton and seed contained therein, which is a much larger percentage than is commonly supposed, as it is a fact that a mill of ordinary size will lose a full bale of cotton every day on account of the particles which escape in the waste.

I have not shown or described in detail the means for operating the fan, conveyers, brushes, &c., as these are of the ordinary types and form no essential part of my invention. This apparatus can also be used on cotton just as it is gathered from the fields, especially if inclosed in the boll-hulls, to prepare said cotton for ginning. In such a case the disintegrating mechanism M $m$ and the separating mechanism to which it delivers are used.

It is obvious that many changes might be made in the construction and arrangement of the various parts without departing from the spirit of my invention, and I wish it to be expressly understood that I do not limit myself to the exact construction and arrangement shown.

Having thus described my invention, what I claim as new, and desire to secure by Letters Patent of the United States, is—

1. The process of treating cotton-waste, which consists in subjecting it to the action of a current of air whereby the heavy trash is at once separated therefrom, conveying the remainder of the waste along by said current of air, and separating therefrom the principal part of the cotton while it is carried along by the air-current, separating the dust and light trash from the remainder, disintegrating said remainder, and separating the cotton from said disintegrated mass, substantially as described.

2. The process of treating cotton-waste, which consists in subjecting it to the action of a current of air, whereby the heavy trash is removed therefrom, removing therefrom fibrous substances, such as strings, conveying the remainder of the waste along by said current of air, and separating therefrom the principal part of the cotton during its transit, separating the dust and light trash from the remainder, disintegrating said remainder, and separating the cotton from said disintegrated mass, substantially as described.

3. The process of treating cotton-waste, which consists in subjecting it to the action of a current of air whereby the heavy trash is removed, conveying the remainder along by said current of air, separating it, during its transit, into two parts, and removing from one of those parts fibrous substances, substantially as described.

4. The process of treating cotton-waste, which consists in subjecting it to the action of a current of air whereby the heavy trash is removed therefrom, removing fibrous substances, such as string, from the remainder of the waste, conveying the waste along by said current of air, dividing said remainder in its transit, into two parts, still further separating the fibrous substances from one of said parts, separating the dust and other light trash from the other of said parts, disintegrating the remainder, and separating the cotton out of the disintegrated mass, substantially as described.

In testimony whereof I affix my signature in presence of two witnesses.

ROBERT R. BOYD.

Witnesses:
JOHN CHALMONT WILSON,
JOHN H. HOLT.